Feb. 9, 1926.
A. J. MICHELIN
1,572,746
COMPRESSIBLE SAFETY RING FOR PNEUMATIC TIRES
Filed June 17, 1925   3 Sheets-Sheet 1
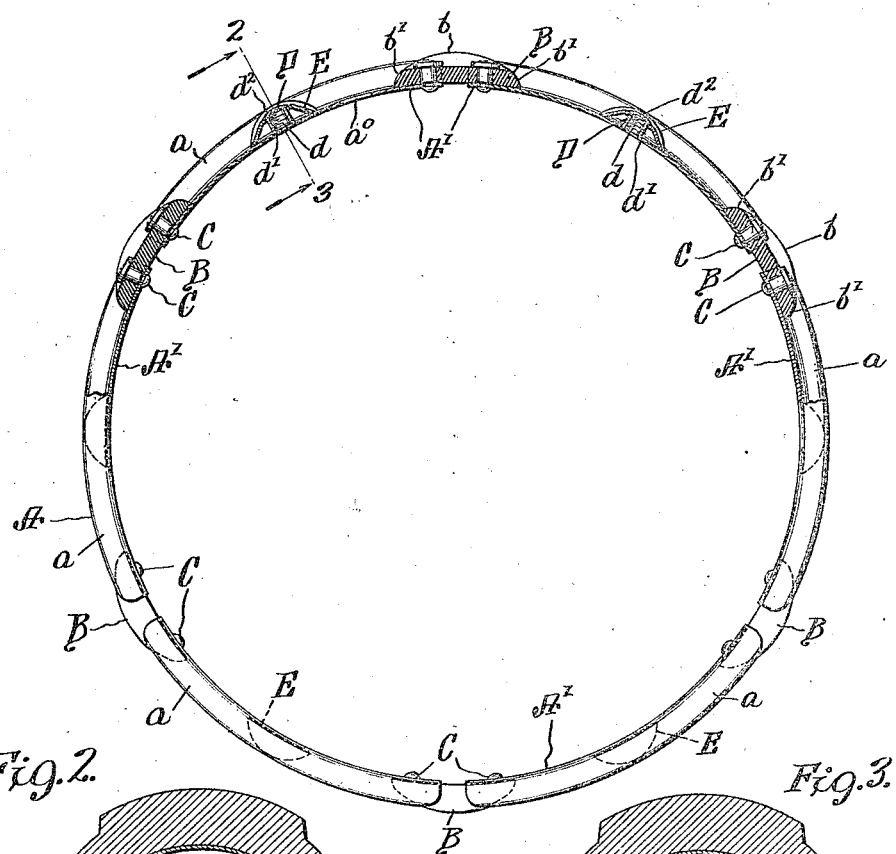
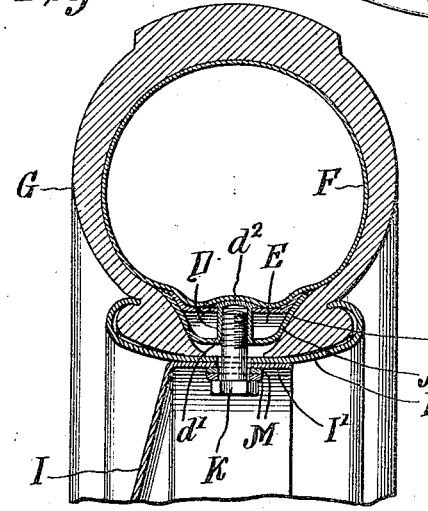
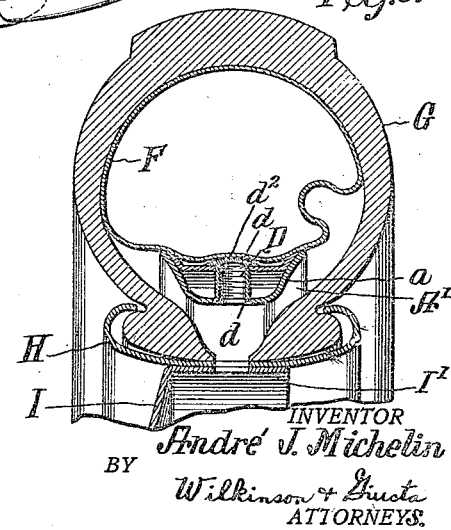
INVENTOR
André J. Michelin
BY Wilkinson & Huxta
ATTORNEYS.

Feb. 9, 1926.  1,572,746
A. J. MICHELIN
COMPRESSIBLE SAFETY RING FOR PNEUMATIC TIRES
Filed June 17, 1925   3 Sheets-Sheet 2
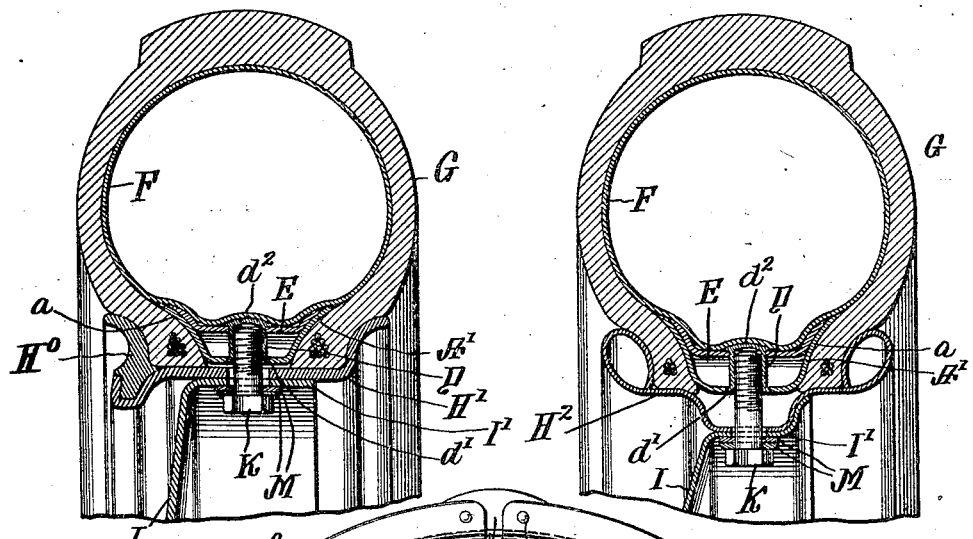
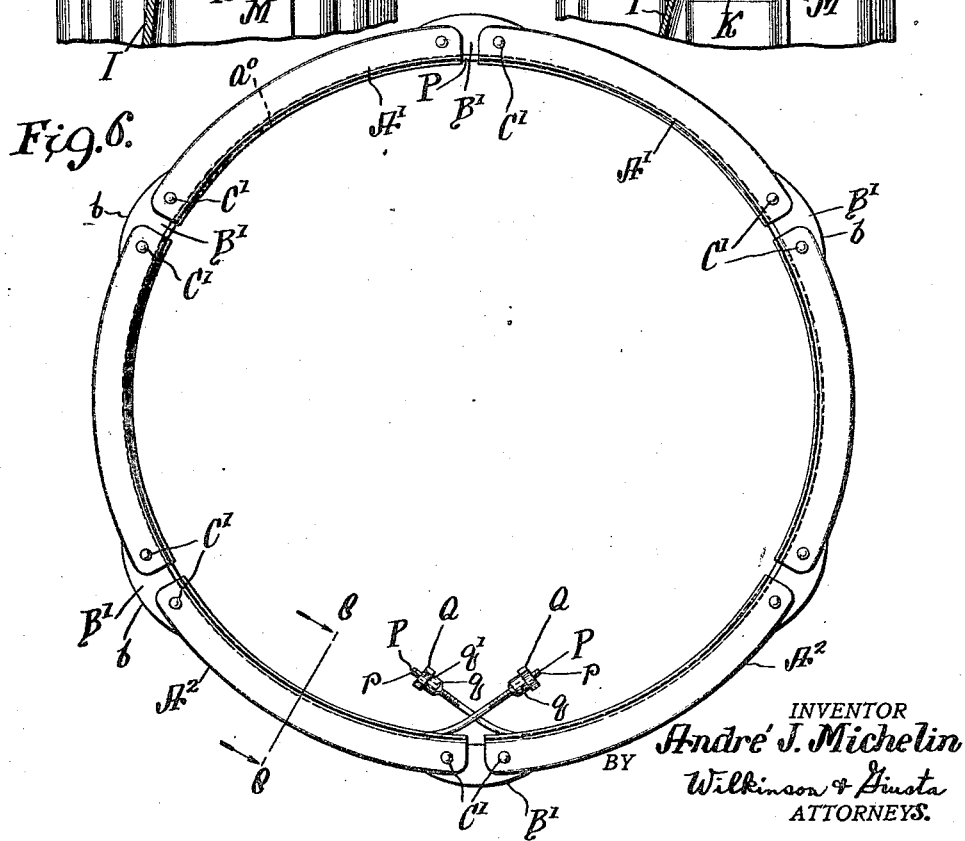
INVENTOR
André J. Michelin
BY Wilkinson & Huxta
ATTORNEYS.

Feb. 9, 1926. 1,572,746
A. J. MICHELIN
COMPRESSIBLE SAFETY RING FOR PNEUMATIC TIRES
Filed June 17, 1925 3 Sheets-Sheet 3
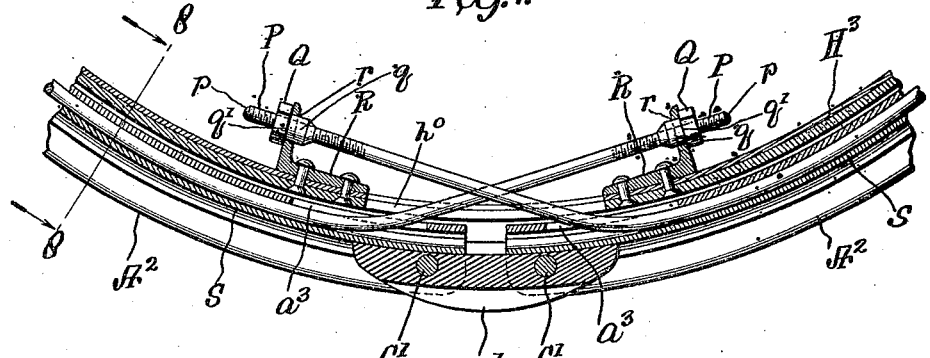
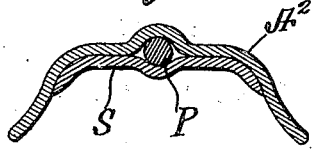
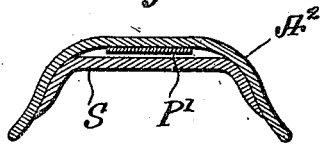
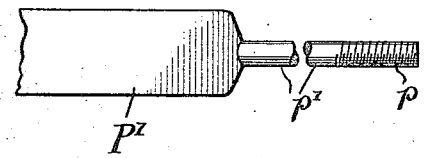
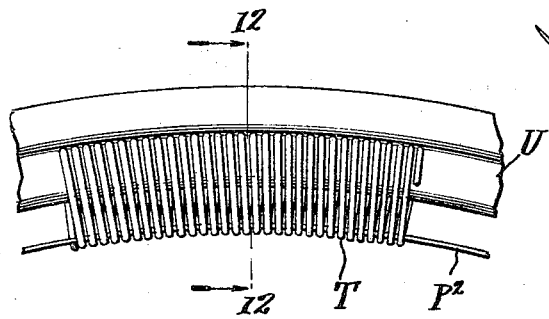
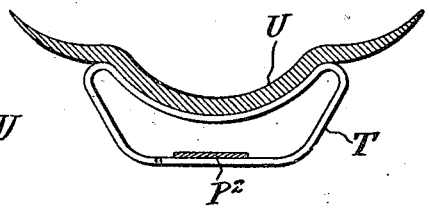
INVENTOR
André J. Michelin
BY Wilkinson & Huxta
ATTORNEYS.

Patented Feb. 9, 1926.

1,572,746

UNITED STATES PATENT OFFICE.

ANDRÉ JULES MICHELIN, OF PARIS, FRANCE.

COMPRESSIBLE SAFETY RING FOR PNEUMATIC TIRES.

Application filed June 17, 1925. Serial No. 37,811.

*To all whom it may concern:*

Be it known that I, ANDRÉ JULES MICHE-LIN, a citizen of the French Republic, residing at Paris, France, have invented certain new and useful Improvements in Compressible Safety Rings for Pneumatic Tires; and I do hereby declare the following to be a full, clear, and exact description of the invention, such as will enable others skilled in the art to which it appertains to make and use the same.

The invention relates to a new safety ring by means of which a pneumatic tire may be securely held on its rim even when the rim becomes deflated, as by a blow-out, when travelling at high speed.

Various ring devices have been proposed for this purpose, all of which present serious defects.

Most known rings are formed either of a continuous and extensible circle, or of an annular metal strip broken at one point, generally opposite the valve opening. In general, the dimensions of the continuous circle or the metal strip or band are such that in the normal condition the diameter of the circle thus formed is equal to or slightly less than the diameter of the bottom of the rim. The safety ring thus has a tendency to drop down in proportion as the beads of the tire enter into the flanges of the rim during inflation. But such a device presents the serious defect that the safety ring remains in contact with the beads and constantly tends to insert itself between them. Such conditions, render mounting difficult, and render demounting almost impossible, as the ring remains in position between the beads, even after the inner tube is deflated, and it is difficult to move or displace one of the beads to withdraw it form its flange in removing the tire. This point of fixation is generally effected by means of the valve which passes through a suitable opening of the safety ring. As a result, when the safety ring descends into position during the inflation of the inner tube, the various points of this safety ring will not move along the radii of the rim, except at points immediately adjacent the valve. The other points follow curved paths, which separate for a greater radius of the rim the further these points themselves were from the valve, so that the movements of these points comprise a component tangential with the circle forming the bottom of the rim.

Since, while inflation is not complete, the safety ring rests not on the bottom of the rim, but almost solely on the beads, the rings, in closing tend to move the rubberized surfaces of the beads circumferentially.

There is thus inevitably produced at certain points, a wedging between the ring and the beads involved, this wedging effect not being distributed uniformly over the entire circumference of the ring but being localized almost entirely at a few points. At these points the ring would be efficiently locked on the beads, but this wedging prevents the ring from being applied completely over its entire length, so that, resting for the most part on the beads, the attachment is insecure.

My present invention is intended to overcome these and other defects in the construction and operation of locking devices of the character described.

My invention will be more fully understood after reference to the accompanying drawings in which several embodiments of the invention are shown, and in which like parts are indicated by similar reference symbols, throughout the several views.

Figure 1 is a side elevation of a compressible ring constructed according to my invention, parts being broken away.

Figure 2 shows a section through a tire and a rim when the inner tube is inflated with compressed air, and shows parts in normally locked position.

Figure 3 is a similar view to Figure 2, but shows the inner tube in the deflated position, and the safety ring released and expanded.

In Figures 2 and 3 a tire of the clincher type is shown with corresponding rim.

Figures 4 and 5 are similar views to Figure 2, except that straight side tires are shown, and in Figure 4 the rim is shown as provided with the locking ring, while in Figure 5 a grooved rim is shown.

Figure 6 is a similar view to Figure 1, and shows another form of compressible ring with another mode of locking the same against circumferential motion, and lateral stresses.

Figure 7 is a sectional view on a larger scale of the lower portion of Figure 6, showing the ring as mounted and held on a rim.

Figure 8 is a sectional view along line 8—8 of Figure 6, and looking in the direction of the arrows, such section showing also parts along the line 8—8 of Figure 7.

Figure 9 represents a similar view to Figure 8 in which a flat metal strip is substituted for the fastening rod or cable of Figure 8.

Figure 10 is a detail showing a part of the flat metallic strip.

Figures 11 and 12 represent in side elevation and cross section another form of compressible safety ring, part only of the ring and protecting strip being shown, Figure 12 representing a section along the line 12—12 of Figure 11, and looking in the direction of the arrows.

Referring to the embodiment of the invention shown in Figures 1 to 5 inclusive, A represents a compressible ring made up of a series of segments A' connected together by resilient connecting pieces B and rivets C as shown most clearly in Figure 1. The normal diameter of this ring when not subjected to compression strains should be larger than that of the metal rim on which the tire is to be mounted. The segments A' are shown in the form of grooved metal plates, shaped in cross section, and having the outer sides flaring outward as at $a$. These metal segments may be coated with rubber or leather or other resilient, soft or yielding material, or may be coated with graphite, paraffin or other material to lessen friction if desired, but for the sake of clearness in the drawings, such coating is not shown.

The connecting pieces B shown of rubber, curved as shown at $b$, have the rounded edges $b'$ shown in Figure 1, to avoid any sharp angles engaging the inner tube for reasons hereinafter to be explained. One or more of the segments A' is perforated as at $a°$ to permit the passage therethrough of the valve stem, and in order to lock the ring in the assembled and compressed position, suitable locking means are also provided, such locking means as shown in Figures 1 to 5, comprising the sockets D internally screw threaded as at $d$ and secured to the segment A' as at $d'$. The other ends of these sockets are flanged as at $d^2$ to engage the curved plates E, which present a smooth surface to the inner tube and prevent the tearing of the same when said inner tube is inflated.

Bolts K engage in these sockets D when the parts are in operative position, as shown in Figures 2, 4 and 5, which bolts pass through properly spaced openings in the flange I' of the wheel body I, and also through the rim, and suitable washers M are also provided as shown most clearly in Figures 2, 4 and 5. G represents the tire casing, which may be of the clincher type as shown in Figures 2 and 3, or the straight side type shown in Figures 4 and 5, or any other type. The inner tube F is also constructed and inflated and deflated in the usual way. In the form of device shown in Figures 2 and 3, tires and rims H of the clincher type are shown, and in Figure 4, a casing of the straight side type is shown having a rim H' and a locking ring H°. In the construction shown in Figure 5 a grooved rim H² is shown, and in all of these figures the operation of the safety ring is the same. Thus, in order to assemble the parts, assume the deflated inner tube to be in the casing and the casing removed from the rim. Insert the safety ring between the beads of the casing; and, in its normal or expanded position, as shown in Figure 3, this ring will be entirely clear of the adjacent inside face of the casing, and the tire may be conveniently mounted on the rim.

Now, inflate the inner tube in the usual way, the valve stem, of course, being in place and holding the inner tube and safety ring against circumferential movement. As the inner tube is inflated, the air pressure will press uniformly on all the segments of the safety ring, compressing said ring radially, uniformly and not permitting any overlapping of the parts. When the safety ring is pressed fully outwards to the operative position shown in Figures 2, 4 and 5, the sockets D will register with the bolt holes in the rim, and the bolts K may be inserted and screwed tight, thus locking the safety ring against circumferential movement and lateral stresses. It will be seen that as the inner tube expands, the safety ring will be uniformly compressed, spreading the beads apart laterally, and there will be no tendency of this ring to drag along the inner face of the beads and cut or injure the same, and when the safety ring is in the final compressed position, it will be held in said position by the bolts and will maintain the beads in firm engagement with the flanges of the rim, even should the inner tube become deflated as from puncture or the like.

In order to demount the tire, it is a simple matter to unscrew and remove the bolts K, when the expansion of the saftey ring will cause it to assume the initial expanded position shown in Figure 3, thus freeing it from engagement with the adjacent beads and pressing the deflated inner tube outwards as shown in Figure 3. At this time, the beads may very readily be pushed towards each other, and the tire removed from the rim. This operation is the same, whether the tire be of the clincher type or of any of the other well known types such, for instance, as those shown in Figures 4 and 5.

In the form of safety ring shown in Figure 6, the rubber connecting pieces B' are secured to the segments A' by means of transverse rivets C', instead of radial rivets shown in Figure 1, and the means for holding the safety ring against circumferential or lateral movement on the rim, comprises a rod or cable P, having screw threaded ends to engage the nuts Q. These nuts are revolubly connected to the rim as shown in Figure 7, where R represents an angle iron fastened to the rim and perforated as at $r$ to receive the cylindrical portion $q$ of the nut Q, which is shouldered at $q'$ to engage the face of the angle iron R. These rods P pass through openings $a^3$ in the segments $A^2$ and through an opening $h^\circ$ in the rim $H^3$, as shown in Figure 7. The inner face of the rod or cable P may be protected against contact with the inner tube by means of the metal strip S. When the ring shown in Figure 6 is in the expanded position, the nuts Q may be removed and then, when it is compressed, the free ends $p$ would be inserted through the openings $r$, and the nuts screwed down so as to hold the ring in the contracted or compressed position. The operation of the rings in Figures 6 to 8 is precisely the same as that shown in connection with Figures 1 to 5, the only difference in operation being that the safety ring is held in contracted position and against circumferential and lateral movement by the different locking means.

The rod or cable P shown in Figure 7 may be replaced by a suitable metal strip or strips P' having the reduced end $p'$ and screw threads $p$ as shown in Figures 9 and 10.

While I have shown different means for holding the safety ring in compressed condition after it has been caused to occupy that position by the inflation of the inner tube, obviously various other means might be adopted for accomplishing a similar result, and I do not mean to limit the invention to such details of construction.

Instead of having the compressible safety ring formed of segments with resilient connecting pieces as shown in Figures 1 and 6, I may make it of a continuous single ring of resilient wire as shown in Figures 11 and 12, where T represents a resilient wire wound and shaped to the form shown in cross section in Figure 12, in any convenient way. The interior diameter of this ring, when completed, should be greater than that of the rim on which it is to be fitted, so that when the air pressure is applied, the safety ring will be compressed inwards engaging in the space between the beads as with the other forms of safety ring previously described.

I may provide a suitable strip of rubber or other suitable material U to go between the inner tube and the safety ring as shown in Figure 12. This safety ring may be held in contracted position by means of a metal band $P^2$, having its ends connected together in any convenient way.

The resilient wire, forming the safety ring, may be coated with rubber or other material, if desired, or may be left uncoated, if preferred. Instead of using the wire, resilient strips of metal bent in U-shape or other suitable cross section, might be adopted, if desired. Furthermore, there may be several segments of the resilient wire used to form a single ring.

It will be seen from the foregoing that among essential features of the invention are:

1. The ring is elastic. When in a state of rest, its diameter is greater than that of the bottom of the rim, so that it does not bear on the beads nor impede mounting. The ring is retained or locked in position at the moment of inflation by the pressure of the compressed air in the inner tube. It is retained in this position by means of suitable devices. As soon as the inner tube is deflated and the above mentioned devices removed or released, the ring resumes automatically its diameter greater than that of the bottom of the rim, forcing the inner tube outwards in the casing and disengaging the beads, after which the tire can be easily removed by known methods.

2. The ring is arranged in such manner that when it is contracted or expanded its various points all move in paths along the radii of the circle constituting the bottom of the rim, so that the attachment is effected by bearing normally on the beads without any tendency to displace or drag the rubberized surface of the beads around the rim. The result thereof is the elimination of the above mentioned wedging effect and the production of a uniform and efficient attachment over the entire periphery of the tire.

While I have described various modifications of the general idea, it will be obvious that various changes in the construction and modification of parts might be adopted, which could be used without departing from the spirit of my invention, and I do not mean to limit the invention to such details, except as particularly pointed out in the claims.

Having thus described my invention, what I claim and desire to secure by Letters Patent of the United States is:

1. A compressible safety ring for pneumatic tires comprising a series of arc shaped segments, with compressible resilient connectors securing said segments together so that the ring may be contracted radially under pressure and tend to return automatically to the expanded position when said pressure is released, substantially as and for the purposes described.

2. A compressible safety ring for pneumatic tires comprising a series of arc shaped segments, grooved circumferentially, with compressible resilient connectors securing said segments together so that the ring may be contracted radially under pressure and tend to return automatically to the expanded position when said pressure is released, substantially as and for the purposes described.

3. A compressible safety ring for pneumatic tires comprising a series of arc shaped segments, with rubber connectors securing said segments together so that the ring may be contracted radially under pressure and tend to return automatically to the expanded position when said pressure is released, substantially as and for the purposes described.

4. A compressible ring for pneumatic tires comprising a series of arc shaped segments, grooved circumferentially, with rubber connectors securing said segments together so that the ring may be contracted radially under pressure and tend to return automatically to the expanded position when said pressure is released, substantially as and for the purposes described.

5. In a safety attachment for pneumatic tires, the combination with the casing and the rim, of a compressible elastic safety ring, normally of greater diameter than the circumference of said rim, and adapted to fit between the beads of the tire, and an inner tube adapted to be filled with compressed air, and to force said compressible safety ring inwards between said beads and in engagement with said rim, with additional means for holding said safety ring in the contracted position on said rim.

6. In a safety attachment for pneumatic tires, the combination with the casing and the rim of a compressible circumferentially grooved elastic safety ring, normally of greater inner diameter than the circumference of said rim, and adapted to fit between the beads of the tire, and an inner tube adapted to be filled with compressed air, and to force said compressible safety ring inwards between said beads and in engagement with said rim, with additional means for holding said safety ring in the contracted position on said rim.

7. In a safety attachment for pneumatic tires, the combination with the casing and the rim of a compressible elastic safety ring, made up of arcuate segments joined together by elastic connectors, said ring being normally of greater diameter than the circumference of said rim, and adapted to fit between the beads of the tire, and an inner tube adapted to be filled with compressed air, and to force said segments radially inwards between said beads and in engagement with said rim, with additional means for holding said safety ring in the contracted position on said rim.

8. In a safety attachment for pneumatic tires, the combination with the casing and the rim of a compressible elastic safety ring, made up of arcuate, circumferentially grooved trough shaped segments joined together by elastic connectors, said ring being normally of greater diameter than the circumference of said rim, and adapted to fit between the beads of the tire, and an inner tube adapted to be filled with compressed air, and to force said segments radially inwards between said beads and in engagement with said rim, with additional means for holding said safety ring in the contracted position on said rim.

9. In a safety attachment for pneumatic tires, the combination with the casing and the rim of a compressible elastic safety ring, normally of greater diameter than the circumference of the said rim, the said ring being formed of a plurality of arcuate metal segments, each of trough shaped cross section, and adapted to fit between the beads of the tire, with elastic connectors joining said segments, and an inner tube adapted to be filled with compressed air, and to force said segments radially inwards between said beads and into engagement with said rim, with additional means for holding said safety ring in the contracted position.

ANDRÉ JULES MICHELIN.